June 4, 1963   J. E. KOVACH   3,091,833
APPARATUS FOR CURING MOLDED BUILDING BLOCKS
Filed May 4, 1960
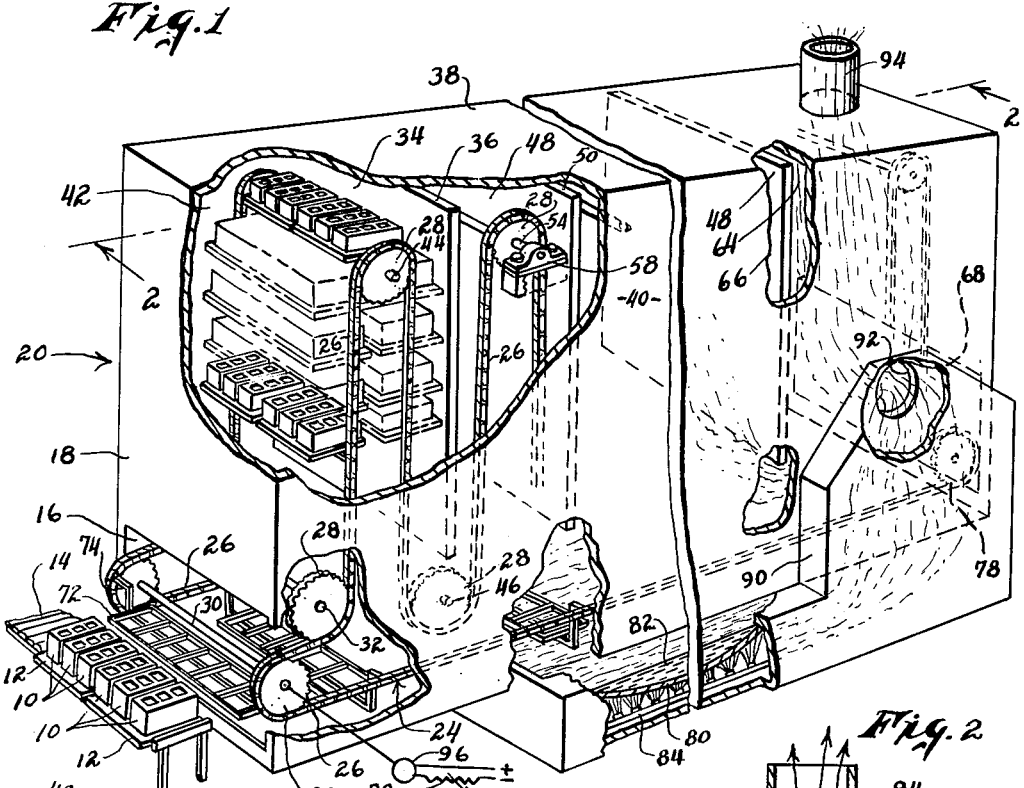
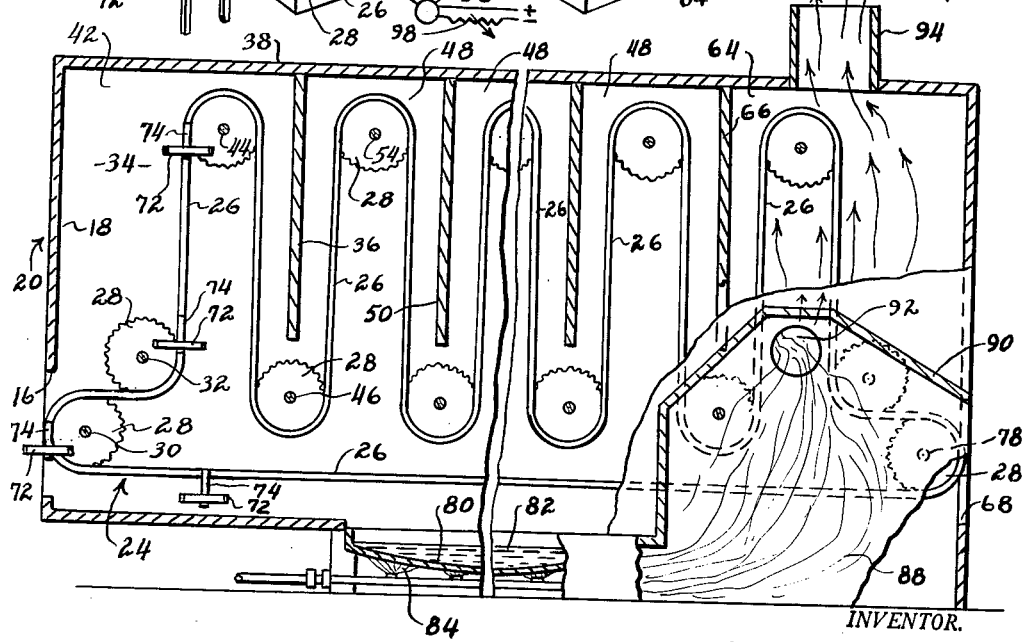
INVENTOR.
John Kovach
BY Emery, Whittemore
Sandoe & Graham
ATTORNEYS

United States Patent Office 3,091,833
Patented June 4, 1963

3,091,833
APPARATUS FOR CURING MOLDED
BUILDING BLOCKS
John E. Kovach, Nutley, N.J., assignor to Bergen Machine & Tool Co., Inc., Nutley, N.J., a corporation of New Jersey
Filed May 4, 1960, Ser. No. 26,742
7 Claims. (Cl. 25—143)

This invention relates to the curing of molded building blocks, such as concrete and cinder blocks.

The blocks come from automatic block-making machines on a pallet, and it is necessary to allow the blocks to harden before they can be stacked for storage or shipping. The hardening, referred to as "curing," is accelerated by placing the blocks, while on their supporting pallets, in steam chambers. Although the operations are mechanized by using racks and lift trucks, considerable labor and space are required for the curing of the blocks.

It is an object of this invention to reduce both the labor and space required for curing molded building blocks. This is achieved by providing both a novel method and novel apparatus for curing the blocks.

It is an object to move the blocks on a conveyor successively through different spaces, in some of which the blocks aret subjected to steam at high temperature which accelerates the curing. The passage from one space to the other is effected by passing the blocks under partitions that separate the spaces, and in each space the blocks are raised into the hotter steam near the top of the space. The partitions are useful for preventing substantial losses of heat through an entrance opening into the first space.

It is another object to provide a housing in which blocks are cured as they move along a conveyor that travels up and down along a tortuous path and with the blocks supported at substantially the same orientation as the conveyor moves the blocks through a housing having heated spaces in which the blocks are cured.

In the preferred embodiment of the invention, the housing is divided by partitions into at least three spaces. The entrance opening leads into the first space and after moving upwardly and then downwardly in this first space, blocks move under a partition and into a second space where they are exposed to an atmosphere of high temperature steam. There may be a plurality of high temperature steam spaces. In a final space, the blocks are preferably exposed to an atmosphere having a high percentage of carbon dioxide which pre-shrinks the blocks so that walls built from the blocks cannot crack as the result of shrinkage.

Other objects, features and advantages of the invention will appear or be pointed out as the description proceeds.

In the drawing, forming a part hereof, in which like reference characters indicate corresponding parts in all the views:

FIGURE 1 is a perspective view, partly broken away, showing apparatus for curing molded building blocks in accordance with this invention; and FIGURE 2 is a fragmentary, vertical sectional view of the apparatus shown in FIGURE 1.

Building blocks 10, from a block-making machine, are delivered on pallets 12, to an accumulator conveyor 14 which terminates in front of an entrance opening 16 in an end wall 18 of a housing 20 containing chambers in which the blocks are to be cured. Each of the pallets 12 contains three blocks 10, this being a usual number for block-making machines. The opening 16 is wide enough to receive two loaded pallets; but it will be understood that the apparatus can be designed for different numbers of pallets and different sizes of pallets, according to the equipment in the block-making machine where the invention is intended to be used.

Within the housing 20 there is a conveyor designated generally by the reference character 24, and including two endless belts which pass around wheels to change their direction of travel. These belts are preferably cables or chains that run on sheaves or sprockets, respectively; and in the drawing the belts are shown as chains 26 which run on sprockets 28. There are two sprockets on a head shaft 30 adjacent to the entrance opening 16. There are deflecting sprockets 28 on a jack shaft 32 for changing the direction of run of the chains 26 from a horizontal to a vertical direction.

From the sprockets 28 on the jack shaft 32, the chains 26 extend upwardly in a first chamber 34. This chamber 34 is separated from the rest of the space within the housing 20 by a partition 36 extending downwardly from a top 38 which covers the entire length of the housing 20. The partition 36 is parallel to the end wall 18 and extends across the entire width of the housing between a front wall 40 and a back wall 42.

Near the upper end of the chamber 34, the conveyor chains 26 extend around sprockets 28 on a cross shaft 44 to reverse the direction of run of the chains.

There are other sprockets 28 located at opposite ends of another cross shaft 46 located below the lower end of the partition 36 for again reversing the direction of run of the chains 26. Beyond these sprockets 28 on the cross shaft 46, the chains 26 extend upwardly in another chamber 48 formed between the partition 36 and a similar partition 50.

At the upper end of this chamber 48 there are other sprockets 28 on another cross shaft 54 for again reversing the runs of the conveyor chains 26.

In similar manner, the conveyor chains 26 travel upwardly and downwardly in other chambers 48, shown in FIGURE 2, so as to provide a tortuous path for the chains and a long period of curing time for blocks which are moved through the housing 20 by the conveyor.

FIGURE 1 shows a bearing 58 at one end of the cross shaft 54. This bearing 58 is supported from the front wall 40, and a similar bearing is located at the other end of the cross shaft 54 and is supported from the back wall 42. All of the sprocket-carrying shafts within the housing 20 are similarly supported by bearings 58, but in order to simplify the illustration, these other bearings are not illustrated.

Beyond the last chamber 48 there is another chamber 64 separated from the last chamber 48 by a partition 66 which is similar to the partitions 36 and 50, already described.

The chamber 64 is the last chamber in the housing 20 and has an outlet opening 68 through which loaded pallets are withdrawn from the chamber 64 with the blocks in a cured condition.

The conveyor 24 includes pallet carriers 72 extending between the conveyor chains 26 and connected to the conveyor chains by links or hangers 74. Each of these hangers 74 is pivotally connected to its associated conveyor chain 26 so that the hangers 74 always extend downwardly regardless of the direction in which the conveyor chains are traveling. The hangers 74 are shorter than the radius of each sprocket 28 so that the pallet carriers 72 can travel across the top of the various shafts 30, 44 and 54. FIGURE 1 shows an empty pallet carrier 72 located at the entrance opening 16 ready to receive the loaded pallets 12 which are pushed off the accumulator conveyor 14 in a sidewise direction and on to the pallet carrier 72 when the latter is at the proper level. FIGURE 1 also shows loaded pallet carriers 72 at a level part way up the height of the first chamber 34, and at a top level in that chamber. Some other loaded pallets are indicated by dotted lines in the chamber 34; but it should be understood that there are similar pallet carriers located along the entire length of both of the conveyor chains 26 as close together as they can be located and still have clearance for blocks located on pallets on the pallet carriers.

After following a tortuous path up and down through the successive chambers 42, 48 and 64, the conveyor chains 26 travel around sprockets 28 at opposite ends of a tail shaft 78, and then travel along a substantially straight line directly back to the sprockets 28 on the head shaft 30. No supporting sprockets are shown for this returning run of the conveyor chains 26, but it will be understood that supports are provided as necessary, depending upon the length of the housing 20. These supports are sprockets similar to those used for the conveyor chains where they change their direction of travel.

In the bottom of the housing 20 there is a pan 80 filled with water 82. A heater 84, located under the pan 80, boils the water 82 and causes steam to rise into the chambers 42 and 44.

Because of the entrance opening 16 in the front wall 18 of the chamber 42, this chamber loses substantial heat and operates at a temperature below 100° F. This temperature control can be maintained by allowing sufficient leakage of steam, as determined by the size of the entrance opening 16, or by other heat escapement means, if desired. It is advantageous to let the blocks 10 acquire an initial set at an intermediate temperature somewhat less than 100° F.

Steam rising into the chambers 48 can not escape and provides a saturated steam atmosphere where the blocks are exposed to the high temperature of the steam to accelerate their curing. The steam is preferably at superatmospheric pressure.

Flue gases 88, from the flames of the heater 84, pass into breaching 90 and from this breaching through an opening 92 which leads into the last chamber 64. These flue gases rise in the chamber 64 and discharge through a chimney 94.

By using hydrocarbon fuel in the heater 84, flue gases are obtained which consist principally of carbon dioxide and steam. Some additional steam escapes from the lower end of the last chamber 48 into the chamber 64. The atmosphere of the chamber 64, rich in carbon dioxide, produces a shrinking of the blocks. This pre-shrinking, as a last step in the curing of the blocks, makes them a more stable product and prevents the cracking of walls such as has occurred as a result of subsequent shrinking of molded blocks which were not cured by process including a pre-shrinking step.

In place of the water pan 80, any other source of steam can be used, but even with an external source of steam, flue gases from the steam-producing unit can be introduced into the lower part of the curing chamber 64 to produce the pre-shrinking of the blocks.

The conveyor 24 is power driven and the power can be applied to any of the sprockets 28. The power drive is illustrated diagrammatically in FIGURE 1 as a motor 96 supplied with electricity through a variable resistance 98. This variable resistance is merely representative of speed control means for changing the rate of travel of the conveyor, and the time that the blocks remain in the curing chambers.

The preferred embodiment of the invention has been illustrated and described, but changes and modifications can be made and some features can be used in different combination without departing from the invention as defined in the claims.

What is claimed is:

1. Apparatus for curing molded building blocks including a housing having an entrance opening through which blocks are introduced into the housing, a conveyor in the housing movable up and down in the chamber along a tortuous path, the tortuous conveyor having holders for supporting the blocks and connections between the holders and the rest of the tortuous conveyor movable to maintain the blocks at a substantially constant orientation as they travel along the course of said tortuous conveyor, an accumulator conveyor outside of the housing and to which pallets loaded with blocks are delivered, the accumulator conveyor extending adjacent to said entrance opening, said tortuous conveyor having runs with substantial horizontal components of travel both to and from said entrance end, a portion of the path of the tortuous conveyor taking successive holders close enough to the accumulator conveyor at the entrance end opening for pallets on the accumulator conveyor to be displaced directly from said accumulator conveyor to a holder of the tortuous conveyor, means adjacent to said entrance end and around which the conveyor run toward the entrance end changes its direction of travel at said entrance opening end and moves away from said entrance opening, power driving mechanism for advancing the tortuous conveyor at a controlled speed, a discharge station at which blocks are removed from the tortuous conveyor and from the housing, and means for heating the blocks as they travel along the course of the tortuous conveyor in said housing.

2. The apparatus described in claim 1, characterized by the accumulator conveyor extending lengthwise across the opening at the entrance end of the housing for orienting the pallets with a plurality of blocks of greater length than width on each pallet with the long dimensions of the blocks parallel to one another and at right angles to the width of said entrance opening, and said entrance opening having a width equal to the length of at least two pallets as oriented on the accumulator conveyor, and each holder of the tortuous conveyor having a width sufficient to receive two loaded pallets when thrust transversely from the accumulator conveyor directly to a holder located adjacent to the entrance opening.

3. The apparatus described in claim 1, and in which the tortuous conveyor includes two endless flexible belts and wheels about which the belts change their direction of travel about substantially horizontal axes near the bottom and top of the chamber to obtain the tortuous course of said tortuous conveyor, and holders extending horizontally between the belts and having vertical portions pivotally connected to the belts for maintaining the supports in a similarly oriented hanging position at all locations along the path of the tortuous conveyor to maintain a substantially constant orientation of the blocks carried on said pallets, two of the wheels being located at the entrance and two at the discharge end and constituting the means adjacent said entrance and discharge end, around which the tortuous conveyor runs change their direction of travel.

4. The apparatus described in claim 1 and in which the interior of the housing is divided into different spaces by partitions that extend downward from the top of the housing between an upwardly and a downwardly extending run of the tortuous conveyor, and the partitions terminate far enough above the bottom of the housing for passage of the pallet supports and blocks under the bottoms of the partitions.

5. The apparatus described in claim 4, and in which there are means for introducing steam into the space on one side of one of the partitions and there are means for introducing an atmosphere containing a high percentage of carbon dioxide into the space of the other side of that partition for pre-shrinking the blocks as they pass through said space on the other side of that partition.

6. The apparatus described in claim 5, and in which there is a boiler for making steam for one part of the housing, and there is a combustion space below the boiler with an exhaust for products of combustion from said combustion space, and the exhaust for the products of combustion leads to the space of the housing having the atmosphere containing a high percentage of carbon dioxide.

7. The apparatus described in claim 3, and in which the entrance opening is at one end of the housing and the discharge station is at the other end of the housing, and the endless belts follow the tortuous path as the conveyor extends from the entrance end to the discharge end of the housing, and the endless belts follow a short and direct path back to the entrance end of the housing.

References Cited in the file of this patent

UNITED STATES PATENTS

| | | |
|---|---|---|
| 153,020 | Rowland | July 14, 1874 |
| 1,408,663 | Wainford et al. | Mar. 7, 1922 |
| 1,916,949 | Harrison et al. | July 4, 1933 |
| 2,274,426 | Miller | Feb. 24, 1942 |
| 2,575,462 | Nugey | Nov. 20, 1951 |

FOREIGN PATENTS

| | | |
|---|---|---|
| 338,561 | France | Dec. 30, 1904 |
| 591,036 | Germany | Jan. 16, 1934 |
| 939,917 | Germany | Mar. 8, 1956 |